United States Patent Office 3,789,045
Patented Jan. 29, 1974

3,789,045
REACTION OF POLYISOCYANATES WITH COMPOUNDS CONTAINING BLOCKED AMINE GROUPS IN THE PRESENCE OF ACIDS OR METAL SALTS OF ACIDS
Arthur J. Coury, St. Paul, Edgar R. Rogier, Minnetonka, and Gerald L. Schwebke and Douglas D. Cozad, Minneapolis, Minn., assignors to General Mills Chemicals, Inc.
No Drawing. Filed Nov. 13, 1972, Ser. No. 306,071
Int. Cl. C08g 22/02
U.S. Cl. 260—18 TN
15 Claims

ABSTRACT OF THE DISCLOSURE

Polymers are prepared by the reaction of polyisocyanates and certain polyamine derivatives in the presence of an organic acid, a salt of an organic acid or a mineral acid. The latter compounds accelerate the reaction even in the absence of moisture normally used to unblock the ketimine or aldimine groups of the polyamine derivative.

---

The present invention relates to a process for preparing polymers and, more particularly, to such a process wherein certain polyamine derivatives are reacted with polyisocyanates in the presence of an organic acid, a salt of an organic acid or a mineral acid.

A new group of polyamine reactants for the preparation of polyureas was recently discovered. These reactants are derivatives of polyamines containing two primary amine groups and one secondary amine group. The primary amine groups are blocked or ketimine or aldimine groups and the secondary amine group is converted to a urea group by reaction with an organic diisocyanate. These compounds can be represented by the general formula

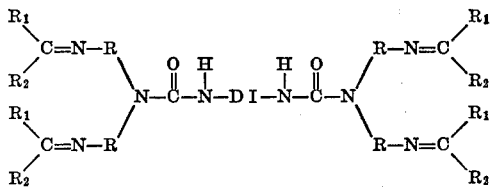

wherein $R_1$ and $R_2$ are organic radicals of 1 to 6 carbon atoms or hydrogen with the proviso that one must be an organic radical, R is an alkylene group of 2 to 6 carbon atoms and DI is the residue of an organic diisocyanate exclusive of the isocyanato groups. These polyamine derivatives were found to be good polyfunctional reactants with polyisocyanates in the presence of moisture to yield polyureas. The moisture serves to hydrolyze the aldimine or ketimine groups back to the primary groups which are reactive with the isocyanato groups of the polyisocyanate. In the absence of moisture, they can be mixed with the polyisocyanate to yield curable compositions having reasonable stability. It was considered desirable to find a procedure whereby polyureas could be prepared from the polyamine derivatives without the need for moisture.

We have now discovered that the reaction of the polyamine derivatives as generally described above with polyisocyanates can be accelerated through the use of organic acids, salts thereof or mineral acids. Moreover, the addition of the accelerator provides shorter curing times for the moisture cured system, probably through a combination of moisture-activated and moisture-free reaction. Several advantages of our invention become apparent. A polymer of the polyamine derivative and the polyisocyanate can be prepared without moisture at controllable rates of formation simply by the addition of reaction accelerating amounts of the organic acid, salt thereof or mineral acid. This technique lends itself to the preparation of potting resins, quick-setting adhesives and the like. Such polymers are formed, it is theorized, in an addition reaction with formation of at least some amide linkages and without the liberation of small molecules. Curing times for the moisture cured system can be reduced in a controlled fashion as in, for example, the preparation of coatings and films.

As indicated previously, the polyamine derivatives are prepared from the polyamine by reaction with an aldehyde or ketone and then with an organic diisocyanate. The starting polyamines are the alkylene triamines of the formula $$H_2N-R-N-R-NH_2$$
$$|$$
$$H$$

wherein R is an alkylene group of 2–6 carbon atoms. Representative starting polyamines are diethylene triamine, dibutylene triamine, trihexylene triamine and the like.

The primary amine groups in the alkylene polyamine are converted to aldimine or ketimine groups by reaction with a carbonyl compound. Such carbonyl compounds may have the following general formula

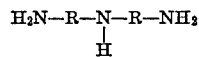

wherein $R_1$ and $R_2$ are organic radicals or hydrogen and are each substantially inert to the ketimine or aldimine formation reaction. At least one of the $R_1$ and $R_2$ groups must be an organic radical. Preferably $R_1$ and $R_2$ are alkyl groups of 1 to 6 carbon atoms. Representative examples of carbonyl reactants include such aldehydes and ketones as acetone, methylethyl ketone, diethyl ketone, methylpropyl ketone, methylisopropyl ketone, methylisobutyl ketone, methyl-tert-butyl ketone, ethylisopropyl, ketone, acetaldehyde, propionaldehyde, butyraldehyde, isobutyraldehyde, hexanone, hexanal and the like.

A wide variety of diisocyanates may be used in the preparation of the derivatives. These may be aliphatic, cycloaliphatic, aryl, araliphatic etc. Representative polymethyl diisocyanates are ethylene diisocyanate, trimethylene diisocyanate, tetramethylene diisocyanate, pentamethylene diisocyanate, hexamethylene diisocyanate, etc.; other alkylene diisocyanates, such as propylene-1,2-diisocyanate, butylene-1,2-diisocyanate, butylene-1,3-diisocyanate, butylene-2,3-diisocyanate, etc.; alkylidene diisocyanates, such as ethylidene diisocyanate, butylidene diisocyanate, etc.; cycloalkylene diisocyanates, such as cyclopentylene-1,3-diisocyanate, cyclohexylene-1,4-diisocyanate, 4,4'-diisocyanato bis(cyclohexyl)methane, etc.

Examples of araliphatic diisocyanates which may be used in the present invention include the following:

p-phenylene-2,2'-bis(ethyl isocyanate),
p-phenylene-3,3'-bis(propyl isocyanate),
p-phenylene-4,4'-bis(butyl isocyanate),
m-phenylene-2,2'-bis(ethyl isocyanate),
1,4-naphthalene-2,2'-bis(ethyl isocyanate),
4,4'-diphenylene-2,2'-bis(ethyl isocyanate),
4,4'-diphenylene ether-2,2'-bis(ethyl isocyanate),
tris(2,2',2''-ethyl isocyanate benzene),
5-chloro phenylene-1,3-bis(propyl-3-isocyanate),
5-methoxy phenylene-1,3-bis(propyl-3-isocyanate),
5-cyano phenylene-1,3-bis(propyl-3-isocyanate) and
5-methyl phenylene-1,3-bis(propyl-3-isocyanate).

Typical aromatic diisocyanates which may be used include tolylene diisocyanate, m-phenylene diisocyanate, p-phenylene diisocyanate, 1-methyl-2,4-phenylene diisocyanate, naphthylene-1,4-diisocyanate, diphenylene-4,4'-diisocyanate, etc.; aliphatic-aromatic diisocyanates such as xylylene-1,4-diisocyanate, xylylene-1,3-diisocyanate, 4,4'-diphenylenemethane diisocyanate, etc.

A particularly desirable group of diisocyanates to be employed in the present invention are those described in U.S. Pat. 3,455,883 to Rogier and Kamal. The isocyanates of the patent are derived from polymeric fat acids and have the following idealized structural formula:

$$[R'] + (CH_2)_yNCO]_x$$

where $y$ is 0 or 1, $x$ is an integer of 2 to about 4 and R' is the hydrocarbon group of polymeric fat acids. Preferably, $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

$$3D(COOH)_2 + 2PCl_3 \longrightarrow 3D(COCl)_2 + 2H_3PO_3$$
$$D(COCl)_2 + 2NaN_3 \longrightarrow D(CON_3)_2 + 2NaCl$$
$$D(CON_3)_2 \xrightarrow{\Delta} D(NCO)_2 + 2N_2$$

The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example):

$$D(COOH)_2 + 2(NH)_3 \longrightarrow D(CN)_2 + 4H_2O$$
$$D(CN)_2 + 4H_2 \xrightarrow[\text{Catalyst}]{NH_3} D(CH_2NH_2)_2$$
$$D(CH_2NH_2)_2 + COCl_2 \longrightarrow D(CH_2NCO)_2 + 2HCl$$

The polymeric fat acids, useful as the starting materials for preparing the above polyisocyanates, are prepared by polymerizing a fat acid. The term "fat acid" as used herein refers to naturally occurring and synthetic monobasic aliphatic acids having hydrocarbon chains of 8–24 carbon atoms. Preferably the starting acids are ethylenically unsaturated acids of 16 to 22 carbon atoms.

The polyamine derivatives are prepared by simply mixing the ketimine or aldimine blocked polyamine with the described organic diisocyanate. Such mixing is preferably carried out in a reaction environment substantially free of moisture. Where desired, the reaction mixture may be heated although the reaction is normally exothermic to a certain extent. The diisocyanate is used in an amount equivalent to the equivalents of free secondary amine group.

The following examples serve to illustrate the preparation of the polyamine derivatives useful in the present invention.

EXAMPLE A

Forty seven parts by weight of the diketimine made from diethylene triamine and methylisobutyl ketone were mixed in an atmosphere substantially free of moisture with 53 parts by weight of dimeryl isocyanate (molar ratio of 2:1). The dimeryl isocyanate had the theoretical structural formula $$D(CH_2NCO)_2$$

where D is the dimeric fat acid radical and in this case was derived from the mixture of dimerized fat acids obtained from the fat acids in tall oil consisting mainly of a mixture of dimerized linoleic and oleic acids. The resulting derivative had the following idealized structural formula:

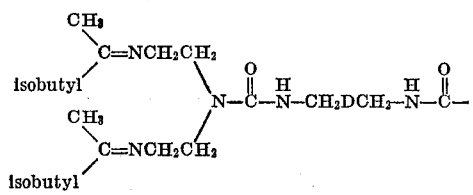
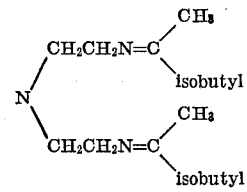

EXAMPLE B

Example A was essentially repeated using 128.4 parts by weight of the diketimine and 154.4 parts by weight of dimeryl isocyanate. In this case the divalent hydrocarbon radical of the diisocyanate was saturated by hydrogenation of the dimerized fat acids prior to their conversion into the diisocyanate. The reaction was conducted under an atmosphere of nitrogen with the reaction mixture being cooled by a bath of circulating tap water. The derivative had the same general structure as that of Example A with D being a saturated divalent hydrocarbon radical.

EXAMPLE C

Example B was essentially repeated using 77 parts of the diketimine of diethylene triamine and methylisobutyl ketone and 26.1 parts toluene diisocyanate (Nacconate 80) (molar ratio 2:1). The diketimine was dissolved in 77 parts by weight of a 1.1 by weight mixture of xylene and Cellosolve acetate was charged to the reaction flask and then the toluene diisocyanate dissolved in 34.0 parts by weight of the above solvent was added through a dropping funnel over a period of about 4 minutes. The reaction was carried out under a blanket of nitrogen and with the use of a cooling bath of circulating cold tap water. The resulting product was a 48.2% by weight solution of the derivative in the solvent, said derivative having the following formula:

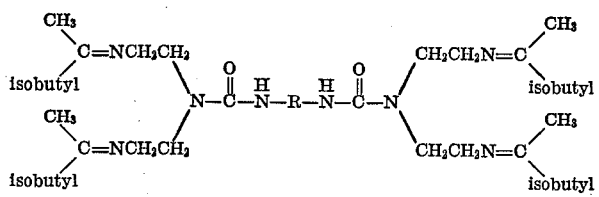

where R is the divalent hydrocarbon radical of the toluene diisocyanate.

The polyisocyanates useful for reaction with the polyamine derivatives include the diisocyanates described in respect of the polyamino derivative preparation. Additionally, triisocyanates and higher polyisocyanates can also be used. Further, the term polyisocyanate is meant to include prepolymers. Such prepolymers are reaction products of polyols or polyester polyols with the polyisocyanates such that products are terminated with NCO groups.

The ratio of the polyamine derivative to the polyisocyanate can vary over relatively wide limits to produce the polyurea polymers. It is preferred to use approximately equivalent amounts of the polyamine derivative and the polyisocyanate, such equivalents being based on the blocked primary amine groups and the isocyanato groups of the reactants.

According to the present invention, an organic acid, a salt of an organic acid or a mineral acid is added to the polyamine derivative and polyisocyanate in an amount sufficient to accelerate the rate of reaction in the polymer preparation. Preferably, the carboxylic compound will be used in an amount of about 0.1 to 10% by weight based on the weight of the polyamine derivative and the polyisocyanate. The reaction can be carried out in the presence or absence of moisture. Additionally, diluents or solvents can be used and the reaction mixture can be heated or cooled to give further control to the rate of reaction. When coatings, films or the like are to be prepared, fillers and/or pigments or dyes can be included.

Any of a wide variety of organic acids can be used in the process of the present invention. The preferred organic acids are the carboxylic acids. Such carboxylic acids may be aliphatic, cycloaliphatic, aromatic, arylaliphatic etc. Representative thereof are acetic, octanoic, higher fatty acids such as oleic, stearic, "isostearic" and the like, polymeric fatty acids, cyclohexanoic, benzoic, phenylacetic and so forth. Another group of organic acids are the sulfonic acids. Representative thereof are methane sulfonic acid, dinonyl naphthalene sulfonic acid and the like. Organophosphoric acids also find use in the invention. Representative of the same are di-2-ethylhexyl phosphoric acid, bromo substituted acid phosphates and so forth. The salts of the organic acids also find use in the present invention. Such salts may be amine or metal salts. Representative amines are triethyl amine, pyridine, trimethyl amine, tributyl amine and long chain fatty amines. Representative metals are the alkali and alkaline earth metals such as sodium, potassium etc. Representative specific salts are sodium oleate and sodium dinonyl naphthalene sulfonate. Mineral acids also accelerate the reaction and representative thereof are phosphoric acid and the HCl.

The following examples serve to illustrate preferred embodiments of the invention without being limiting.

EXAMPLE I

Polyurea polymer-forming systems were prepared by stirring together 1.00 equivalent of the polyamine derivative of Example B, 1.03 equivalent of the dimeryl isocyanate as used in the preparation of the polyamine derivative of Example B and varying quantities of "isostearic" acid (a $C_{18}$ saturated acid mixture, available from Emery Industries) with enough xylene to dilute the reactants to 77% by weight of the total system. The materials were protected from moist air during weighing and stirring. Changes in viscosity were determined at intervals by the use of a Gardner tube containing the reaction system. Ambient temperature was 72–75° F. Pot life was considered as time to Gardner viscosity P (400 centipoise). The results are set forth in the following table.

TABLE I

| Reaction system: | Level of "isostearic" acid (percent by weight of diisocyanate) | Closed pot life (min.) |
|---|---|---|
| A | 0 | 270 |
| B | 0.5 | 130 |
| C | 1.0 | 47 |
| D | 3.0 | 13 |

EXAMPLE II

Example I, systems A and D were repeated except that the "isostearic" acid was replaced by the triethylamine salt of dimer acid (as used in the preparation of the diisocyanate used to produce the polyamine derivative of Example B). Closed pot life for the system containing no accelerator was 470 minutes. The amine salt containing system gave a pot life of 16 minutes, again illustrating the rate of reaction increase due to the carboxylic acid compound.

EXAMPLE III

The same polyamine derivative and diisocyanate were used in the same ratio as in Example I without the xylene solvent. A moisture-free atmosphere at 74° F. was also used and the reaction systems were cast into plugs ⅝ inch thick. Gel time was followed using a Gardner tube containing some of the reactant system. System A contained no acid and system B contained 3% by weight (based on the weight of the diisocyanate) of dimer acid (as used in the preparation of the diisocyanate used to produce the polyamine derivative of Example B). Gel time and Shore D hardness were measured with the results being set forth in the following table.

TABLE II

| Reaction system: | Acid level | Gel time[1] (min.) | Shore D hardness |
|---|---|---|---|
| A | 0 | >300 | Liquid (5 hours). 0 (24 hours). |
| B | 3 | <20 | 11–12 (2 hours). 15 (24 hours). |

[1] Time to cessation of rise of bubble in Gardner tube.

EXAMPLE IV

Example I, systems A and D were essentially repeated using fresh lots of polyamine derivative and dimeryl isocyanate and substituting various accelerators for the "isostearic" acid. The control had a closed pot life of 355 minutes. Three percent by weight of the following acids or salts yielded the following results:

| Acid or salt: | Closed pot life (min.) |
|---|---|
| Benzoic acid | 4 |
| Acetic acid | 2 |
| Sodium oleate | 225 |
| Methane sulfonic acid | 2 |

In similar experiments 3% by weight of di-2-ethylhexyl phosphoric acid and sodium dinonyl naphthalene sulfonate produced a mild acceleration of the closed reaction. Phosphoric acted as a strong accelerator but was not completely soluble in the reaction mixture causing some localized gelling. When the xylene was saturated with HCl, moderate reaction acceleration was obtained. Likewise, 3% by weight of Fyrol 72 (bromoalkyl acid phosphate) gave moderate acceleration.

The embodiments of the invention in which an exclusive property or privilege is claimed are defined as follows:

1. In the process of preparing a polymer of the reaction of an organic polyisocyanate and a polyamine derivative of the formula

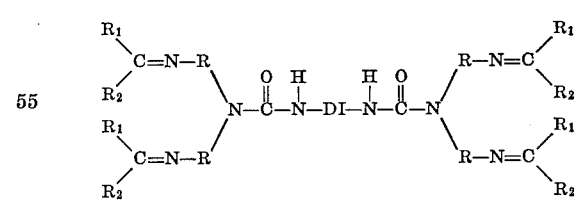

where $R_1$ and $R_2$ are organic radicals of 1 to 6 carbon atoms or hydrogen with the proviso that one must be an organic radical, R is an alkylene group of 2 to 6 carbon atoms and DI is the residue of an organic diisocyanate exclusive of the isocyanato groups, the improvement consisting of carrying out the reaction in the presence of an organic acid, a salt of an organic acid or a mineral acid in an amount sufficient to accelerate the reaction.

2. The process of claim 1 wherein the accelerator is used in an amount of about 0.1 to 10% by weight based on the weight of the polyisocyanate and the polyamine derivative.

3. The process of claim 2 wherein the organic polyisocyanate and polyamine derivative are reacted in approximately equivalent amounts.

4. The process of claim 3 wherein R is ethylene, $R_1$ is methyl, $R_2$ is isobutyl and DI is the residue of a diisocyanate of the formula $$OCN(CH_2)_y\text{—}R'\text{—}(CH_2)_yNCO$$

where $y$ is 0 or 1 and $R'$ is the divalent hydrocarbon group of a dimeric fat acid.

5. The process of claim 4 wherein the polyisocyanate has the formula

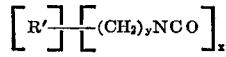

where $y$ is 0 or 1 and $x$ is 2 to about 4.

6. The process of claim 5 wherein $y$ is 1, $x$ is 2 and $R'$ is the divalent hydrocarbon radical of dimeric fat acid prepared from an ethylenically unsaturated monobasic carboxylic acid of 16 to 22 carbon atoms.

7. The process of claim 1 wherein the accelerator is a carboxylic acid.

8. The process of claim 7 wherein the carboxylic acid accelerator is a polymeric fat acid.

9. The process of claim 7 wherein the carboxylic acid accelerator is acetic acid.

10. The process of claim 7 wherein the carboxylic acid accelerator is benzoic acid.

11. The process of claim 7 wherein the carboxylic acid accelerator is fatty acid.

12. The process of claim 1 wherein the accelerator is an organophosphoric acid.

13. The process of claim 1 wherein the accelerator is a sulfonic acid.

14. The process of claim 1 wherein the accelerator is a salt of an organic acid.

15. The process of claim 1 wherein the accelerator is a mineral acid.

References Cited
UNITED STATES PATENTS

| | | | |
|---|---|---|---|
| 3,682,867 | 8/1972 | Shackelford et al. | 260—77.5 |
| 3,595,839 | 7/1971 | Stokes | 260—77.5 |
| 3,493,543 | 2/1970 | Nazy et al. | 260—77.5 |
| 3,629,168 | 12/1971 | Ryan | 260—18 |
| 3,668,186 | 6/1972 | Duncan et al. | 260—77.5 |
| 3,205,201 | 9/1965 | Friedrich et al. | 260—77.5 |
| 3,398,106 | 8/1968 | Hostettler et al. | 260—18 |
| 3,706,687 | 12/1972 | Rudzki | 260—77.5 |
| 3,674,750 | 7/1972 | Brady | 260—77.5 |
| 3,239,480 | 3/1966 | Windemuth et al. | 260—77.5 |
| 3,705,119 | 12/1972 | Levy | 260—18 |

DONALD E. CZAJA, Primary Examiner

E. C. RZUCIDLO, Assistant Examiner

U.S. Cl. X.R.

260—75 NB, 75 NT, 77.5 AB, 77.5 CH, 77.5 TB